US012675583B1

(12) United States Patent
Lawrence et al.

(10) Patent No.: US 12,675,583 B1
(45) Date of Patent: Jul. 7, 2026

(54) SYSTEMS AND METHODS FOR GENERATING SYNTHETIC DATA FOR FEATURE-BASED VULNERABILITY TESTING

(71) Applicant: EYGS LLP, London (GB)

(72) Inventors: Lince Lawrence, Trivandrum (IN); Venkatabapu Yeluri, Bengaluru (IN); Dhanith Krishna B, Trivandrum (IN); Lavanya Wadhwa, Bangalore (IN)

(73) Assignee: EYGS LLP, London (GB)

( * ) Notice: Subject to any disclaimer, the term of this patent is extended or adjusted under 35 U.S.C. 154(b) by 0 days.

(21) Appl. No.: 19/393,957

(22) Filed: Nov. 19, 2025

(51) Int. Cl.
*G06F 21/57* (2013.01)
*G06N 20/00* (2019.01)

(52) U.S. Cl.
CPC ........... *G06F 21/577* (2013.01); *G06N 20/00* (2019.01); *G06F 2221/033* (2013.01)

(58) Field of Classification Search
CPC .. G06F 21/577; G06F 2221/033; G06N 20/00
See application file for complete search history.

(56) References Cited

U.S. PATENT DOCUMENTS

| | | | | |
|---|---|---|---|---|
| 7,013,395 B1 * | 3/2006 | Swiler | ................. | H04L 63/1433 |
| | | | | 713/153 |
| 11,416,622 B2 | 8/2022 | Sharma et al. | | |

| | | | | |
|---|---|---|---|---|
| 2014/0115007 A1 * | 4/2014 | Harvey | ................... | H04L 41/50 |
| | | | | 707/796 |
| 2016/0359872 A1 * | 12/2016 | Yadav | ................. | H04L 63/1408 |
| 2020/0057858 A1 * | 2/2020 | Sharma | ................. | G06F 21/563 |
| 2021/0288992 A1 * | 9/2021 | Attar | ................... | H04L 41/0879 |
| 2022/0201042 A1 * | 6/2022 | Crabtree | ............. | G06F 16/2477 |
| 2024/0411886 A1 * | 12/2024 | Sun | ........................... | G06F 8/65 |
| 2025/0175456 A1 * | 5/2025 | Crabtree | ............... | G06F 16/909 |

(Continued)

OTHER PUBLICATIONS

BishopFox, "Eyeballer," Github.com, first publication date unknown [online]. Retrieved on Dec. 16, 2025 from the Internet from URL: https://github.com/BishopFox/eyeballer?tab=readme-ov-file; 5 pages.

(Continued)

*Primary Examiner* — Blake I Narramore
(74) *Attorney, Agent, or Firm* — COOLEY LLP

(57) ABSTRACT

A method includes receiving, at a processor, feature data that indicates a plurality of features. The method further includes generating, via the processor and based on the feature data, vulnerability data that indicates a vulnerability associated with the plurality of features. Additionally, the method includes generating, via the processor and based on the feature data and the vulnerability data, graph data that represents a plurality of edge weights representing a plurality of severities of the vulnerability. Based on the plurality of edge weights, the method also includes generating, via the processor, matrix data that represents an influence of the plurality of features on the vulnerability. The method further includes generating, via the processor, sorted vulnerability data that defines an order for a plurality of vulnerabilities that includes the vulnerability, based on the matrix data. Synthetic training data is generated, via the processor, based on the sorted vulnerability data.

20 Claims, 9 Drawing Sheets

100

(56)            References Cited

U.S. PATENT DOCUMENTS

2025/0378177 A1* 12/2025 Conikee ............... G06F 21/577
2026/0111567 A1*  4/2026 Huth .................... G06F 21/577

OTHER PUBLICATIONS

BurpGPT, "Enhance your Burp Suite with Large Language Models (LLMs)," Burpgpt.app, first publication date unknown [online]. Retrieved on Dec. 31, 2025 from the Internet at URL: https://burpgpt.app/; 4 pages.

Chowdhary, A. et al., "Autonomous Security Analysis and Penetration Testing," 16th International Conference on Mobility, Sensing and Networking (MSN), [Conference Date: Dec. 17-19, 2020]. Published in IEEE Xplore on (Apr. 7, 2021); 8 pages.

GreyDGL, "PentestGPT," Github.com, first publication date unknown [online]. Retrieved on Dec. 31, 2025 from the Internet at URL: https://github.com/GreyDGL/PentestGPT; 5 pages.

Hu, Z. et al., "Automated Penetration Testing Using Deep Reinforcement Learning," 2020 IEEE European Symposium on Security and Privacy Workshops (EuroS&PW), [Conference Date: Sep. 7-11, 2020]. Published in IEEE Xplore on (Oct. 22, 2020); 9 pages.

Kamalov, F. et al., "Synthetic Data for Feature Selection," arXiv:2211.03035 [cs.LG], (Nov. 6, 2022); 14 pages.

Sbhatta, "How AI-Generated Synthetic Data is Helping Cybersecurity Research," Vocal—storytelling tools platform, published Feb. 2025 [online]. Retrieved on Dec. 17, 2025 from the Internet at URL: https://vocal.media/education/how-ai-generated-synthetic-data-is-helping-cybersecurity-research; 7 pages.

Shah, S., "The use of Synthetic Data to protect from Cybersecurity threats caused by Unstructured Content in the Generative AI Era," Medium, published on Oct. 14, 2024 [online]. Retrieved on Dec. 17, 2025 from the Internet at URL: https://medium.com/@drshwetashah/the-use-of-synthetic-data-to-protect-from-cybersecurity-threats-caused-by-unstructured-content-in-e0fc3243b3ab; 15 pages.

Shmaryahu, D. et al., "Partially Observable Contingent Planning for Penetration Testing," First International Workshop on Artificial Intelligence in Security, (Aug. 20, 2017), vol. 33; 7 pages.

* cited by examiner

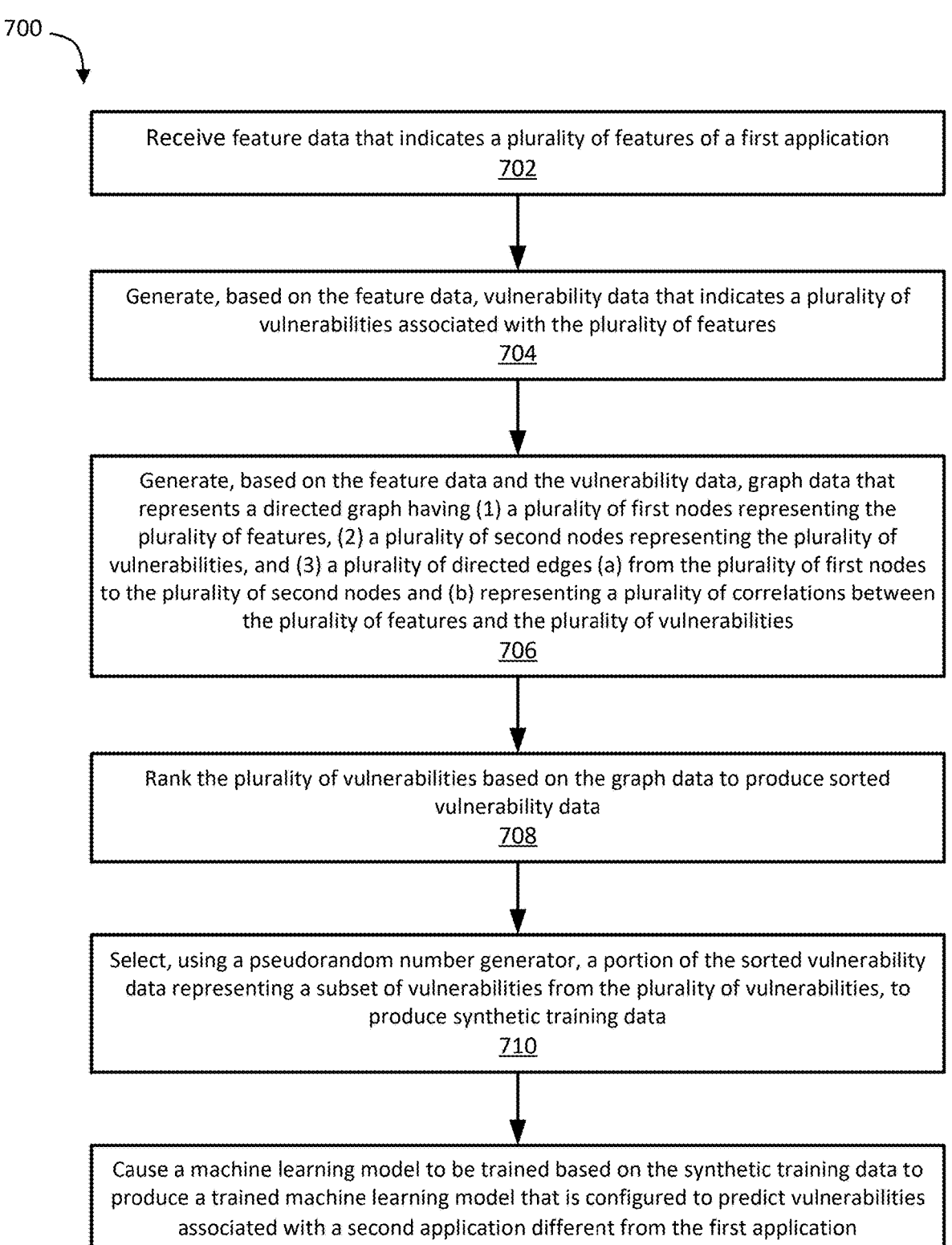

700

Receive feature data that indicates a plurality of features of a first application
702

Generate, based on the feature data, vulnerability data that indicates a plurality of vulnerabilities associated with the plurality of features
704

Generate, based on the feature data and the vulnerability data, graph data that represents a directed graph having (1) a plurality of first nodes representing the plurality of features, (2) a plurality of second nodes representing the plurality of vulnerabilities, and (3) a plurality of directed edges (a) from the plurality of first nodes to the plurality of second nodes and (b) representing a plurality of correlations between the plurality of features and the plurality of vulnerabilities
706

Rank the plurality of vulnerabilities based on the graph data to produce sorted vulnerability data
708

Select, using a pseudorandom number generator, a portion of the sorted vulnerability data representing a subset of vulnerabilities from the plurality of vulnerabilities, to produce synthetic training data
710

Cause a machine learning model to be trained based on the synthetic training data to produce a trained machine learning model that is configured to predict vulnerabilities associated with a second application different from the first application
712

FIG. 7

800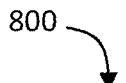

Receive feature data that indicates a plurality of features of an application
802

Generate, based on the feature data, vulnerability data that indicates a vulnerability associated with the plurality of features
804

Generate, based on the feature data and the vulnerability data, graph data that represents (1) a plurality of first nodes representing the plurality of features, (2) a second node representing the vulnerability, and (3) a plurality of edges between the plurality of first nodes and the second node and having a plurality of edge weights that represents a plurality of severities of the vulnerability for the plurality of features
806

Generate, based on the plurality of edge weights, matrix data that represents an influence of the plurality of features on the vulnerability
808

Generate sorted vulnerability data that defines an order for a plurality of vulnerabilities that includes the vulnerability, based on the matrix data
810

Generate synthetic training data based on the sorted vulnerability data
812

FIG. 8

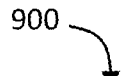

900

Providing, via a processor, first feature data associated with a first application as input to a machine learning model to predict a vulnerability associated with the first application, the machine learning model being trained based on synthetic training data
902

Generate, based on the feature data, vulnerability data that indicates a vulnerability associated with the plurality of features
904

SYSTEMS AND METHODS FOR GENERATING SYNTHETIC DATA FOR FEATURE-BASED VULNERABILITY TESTING

FIELD

One or more embodiments described herein relate to the field of cybersecurity, and more specifically to systems and computerized methods for generating synthetic data to train machine learning models to perform feature-based vulnerability testing.

BACKGROUND

In at least some instances, high-quality, real-world vulnerability data is scarce, as disclosing such data could threaten the cybersecurity of the related entity. Moreover, some known penetration testing techniques give results that lack detailed information on application features, limiting the ability to correlate vulnerabilities with these features. Observed vulnerability data in some instances is also skewed towards high-probability but low impact vulnerabilities, making it difficult to obtain a representative dataset of high-impact vulnerabilities. A need exists, therefore, for systems and methods configured to generate synthetic vulnerability data based on, for example, vulnerability impact and/or likelihood of vulnerability occurrence.

SUMMARY

According to an embodiment, a non-transitory, processor-readable medium stores instructions that, when executed by a processor, cause the processor to receive feature data that indicates a plurality of features of a first application. The instructions further cause the processor to generate, based on the feature data, vulnerability data that indicates a plurality of vulnerabilities associated with the plurality of features. Additionally, the instructions cause the processor to generate, based on the feature data and the vulnerability data, graph data that represents a directed graph having (1) a plurality of first nodes representing the plurality of features, (2) a plurality of second nodes representing the plurality of vulnerabilities, and (3) a plurality of directed edges (a) from the plurality of first nodes to the plurality of second nodes and (b) representing a plurality of correlations between the plurality of features and the plurality of vulnerabilities. Each vulnerability from the plurality of vulnerabilities is ranked based on the graph data to produce sorted vulnerability data, and using a pseudorandom number generator, a portion of the sorted vulnerability data representing a subset of vulnerabilities from the plurality of vulnerabilities is selected, to produce synthetic training data. The instructions also cause the processor to cause a machine learning model to be trained based on the synthetic training data to produce a trained machine learning model that is configured to predict vulnerabilities associated with a second application different from the first application.

According to an embodiment, a method includes receiving, at a processor, feature data that indicates a plurality of features of an application. The method further includes generating, via the processor and based on the feature data, vulnerability data that indicates a vulnerability associated with the plurality of features. Additionally, the method includes generating, via the processor and based on the feature data and the vulnerability data, graph data that represents (1) a plurality of first nodes representing the plurality of features, (2) a second node representing the vulnerability, and (3) a plurality of edges between the plurality of first nodes and the second node and having a plurality of edge weights that represents a plurality of severities of the vulnerability for the plurality of features. Based on the plurality of edge weights, the method also includes generating, via the processor, matrix data that represents an influence of the plurality of features on the vulnerability. The method further includes generating, via the processor, sorted vulnerability data that defines an order for a plurality of vulnerabilities that includes the vulnerability, based on the matrix data. Synthetic training data is generated as part of the method, via the processor, based on the sorted vulnerability data.

According to an embodiment, a method includes providing, via a processor, first feature data associated with a first application as input to a machine learning model to predict a vulnerability associated with the first application, the machine learning model being trained based on synthetic training data. The synthetic training data is generated by generating, based on second feature data associated with a second application, vulnerability data that indicates a plurality of vulnerabilities associated with a plurality of features represented by the second feature data. The synthetic training data is further generated by determining, based on the second feature data and the vulnerability data, a plurality of correlations between the plurality of features and the plurality of vulnerabilities. Additionally, the synthetic training data is generated by ranking the plurality of vulnerabilities based on the plurality of correlations, to produce sorted vulnerability data, and selecting, using a pseudorandom number generator, a portion of the sorted vulnerability data representing a subset of vulnerabilities from the plurality of vulnerabilities, to produce the synthetic training data. The method further includes modifying, via the processor, the first application based on the vulnerability.

BRIEF DESCRIPTION OF THE DRAWINGS

FIG. 7 shows a flow diagram illustrating a method for causing a machine learning model to be trained based on generated synthetic training data, according to an embodiment.

FIG. 8 shows a flow diagram illustrating a method for generating synthetic training data based on sorted vulnerability data, according to an embodiment.

FIG. 9 shows a flow diagram illustrating a method for modifying an application based on a predicted vulnerability, according to an embodiment.

DETAILED DESCRIPTION

Figure 1:
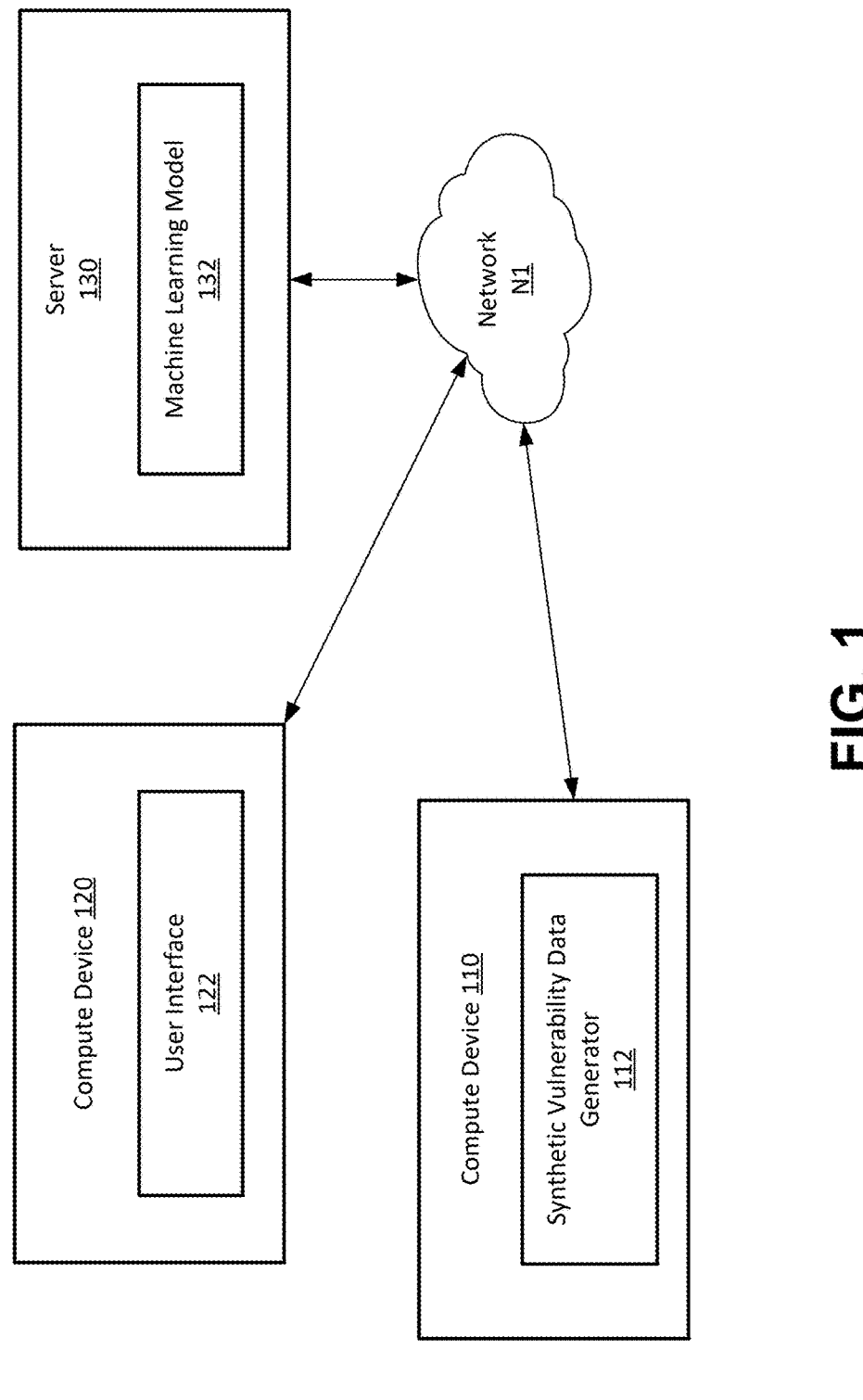
FIG. 1 shows a system block diagram of a vulnerability model training system, according to an embodiment.

FIG. 1 shows a system block diagram of a vulnerability model training system 100, according to an embodiment. As described further herein, the vulnerability model training system 100 can implement/execute an end-to-end process for retrieving unstructured and/or structured document data, classifying the document data, filtering the document data to produce filtered document data, storing the filtered document data, retrieving the document data, and/or integrating user feedback to improve document filtering. In some implementations, the vulnerability model training system 100 can operate on both unstructured and structured document data (e.g., a combination of document data having a predefined format and document data (e.g., free text) that does not have a predefined format) without modification to the vulnerability model training system 100 and/or without receiving an indication of whether the document data is structured (and if so, an indication of specific format). The vulnerability model training system 100 includes a compute device 110, a compute device 120, a server 130, and a network N1. The vulnerability model training system 100 can include alternative configurations, and various steps and/or functions of the processes described below can be shared among the various devices of the vulnerability model training system 100 or can be assigned to specific devices (e.g., the compute device 110, the compute device 120, and/or the like) different from the descriptions herein. For example, in some configurations, a user can provide inputs (as described herein) directly to the compute device 110 rather than via the compute device 120.

In some implementations, the compute device 110, the compute device 120, and/or the server 130 can include any suitable hardware-based computing devices and/or multimedia devices, such as, for example, a server, a desktop compute device, a smartphone, a tablet, a wearable device, a laptop and/or the like. In some implementations, the compute device 110, the compute device 120, and/or the server 130 can be implemented at an edge (e.g., with respect to the network N1) node or other remote (e.g., with respect to the network N1) computing facility and/or device. In some implementations, each of the compute device 110, the compute device 120, and/or the server 130 can be (or be included in) a data center or other control facility and/or device configured to run and/or execute a distributed computing system and can communicate with other compute devices.

The compute device 110 can include a synthetic vulnerability data generator 112, which can include software (1) stored at a memory that is functionally and/or structurally similar to the memory 210 of FIG. 2 discussed below and (2) executed via a processor that is functionally and/or structurally similar to the processor 220 of FIG. 2 discussed below. The synthetic vulnerability data generator 112 can be configured to generate synthetic vulnerability data based on program type, impact, and/or likelihood of vulnerability occurrences, as described herein. The synthetic vulnerability data generator 112 can be functionally and/or structurally similar to the synthetic vulnerability data generator 212 of FIG. 2.

The compute device 120 can implement a user interface 122, which can include a graphical user interface (GUI) (e.g., displayed on a monitor/display) that is configured to receive input data (e.g., an indication of a program to undergo vulnerability testing, an indication of features and/ or vulnerabilities of interest, etc.) from a user. The user interface 122 can further cause display of output data generated by the synthetic vulnerability data generator 112 (e.g., synthetic training data, described further herein). The user interface 122 can be implemented via software and/or hardware.

The server 130 can include a remote (e.g., as to the compute device 110 and/or the compute device 120) compute device(s) that can be configured to train, host, and/or execute a machine learning model 132. The machine learning model 132 can be functionally and/or structurally similar to the machine learning model 332 of FIG. 3 (described herein) can include, for example, a regression-based model, a neural network, and/or etc. In some implementations, the compute device 110 can execute a service (e.g., a prompt service) to provide input data to the machine learning model 132. Alternatively or in addition, although not shown in FIG. 1, the compute device 110 can train, host, and/or execute the machine learning model 132.

The compute device 110 can be networked and/or communicatively coupled to the compute device 120, and/or the server 130, via the network N1, using wired connections and/or wireless connections. The network N1 can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi® and/or Hypertext Transfer Protocol (HTTP), cellular data networks, satellite networks, free space optical networks and/or various combinations of the foregoing. Communication can be facilitated by any device capable of transmitting data to and from other compute devices, such as a modem(s) and/or a wireless interface(s).

In some implementations, although not shown in FIG. 1, the vulnerability model training system 100 can include multiple compute devices 110, compute devices 120, and/or servers 130. For example, in some implementations, the vulnerability model training system 100 can include multiple compute devices 110, where each compute device 110 can be associated with a different user from multiple users. In some implementations, multiple compute devices 110 can be associated with a single user, where each compute device 110 can be associated with, for example, a different input modality (e.g., text input, audio input, video input, etc.). Some implementations can include various combinations of the above.

Figure 2:
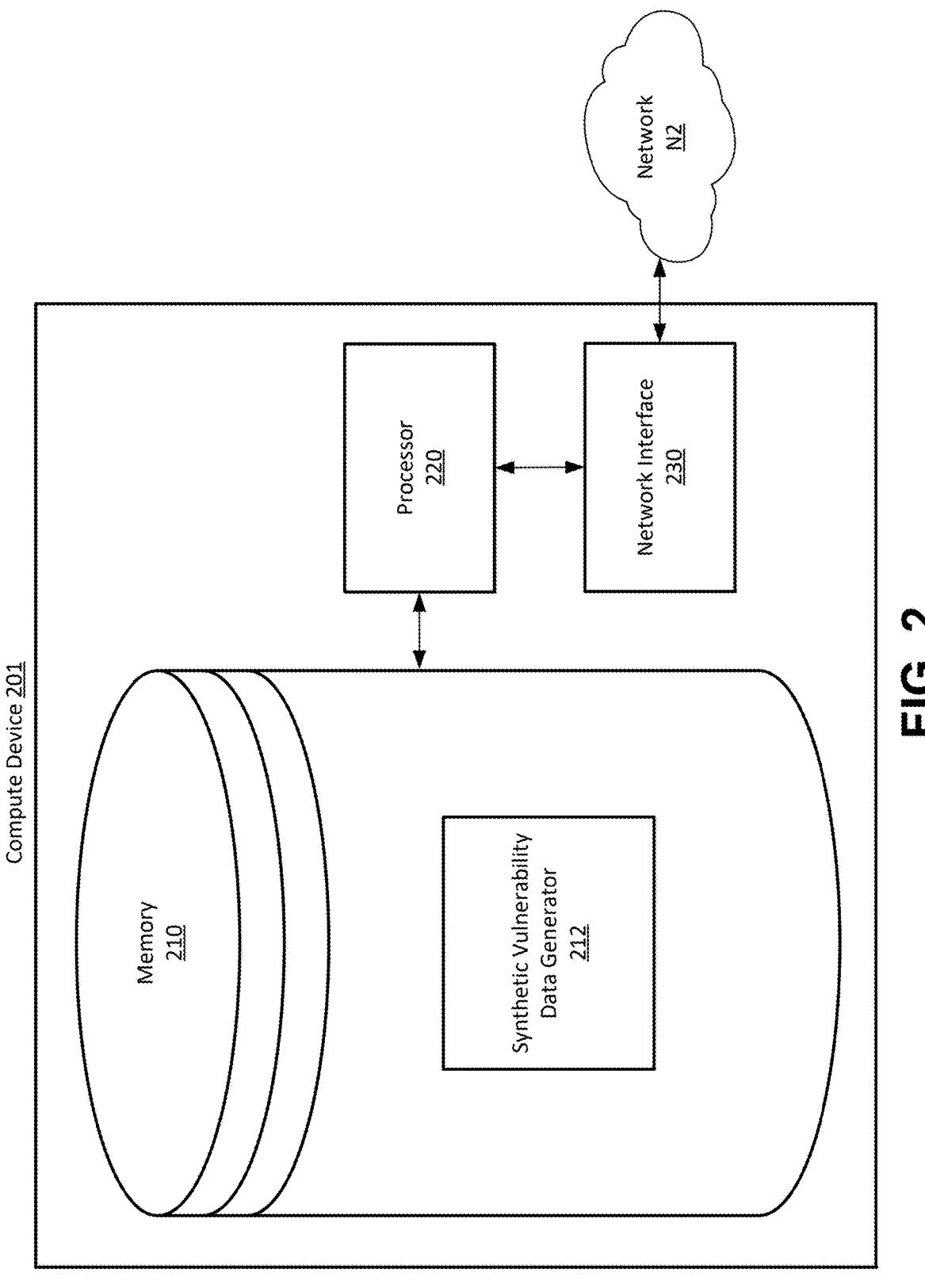
FIG. 2 shows a system block diagram of a compute device included in a vulnerability model training system, according to an embodiment.

FIG. 2 shows a system block diagram of a compute device 201 included in a vulnerability model training system, according to an embodiment. The compute device 201 can be structurally and/or functionally similar to, for example, the compute device 110 of the vulnerability model training system 100 shown in FIG. 1. The compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. The compute device 201 includes a memory 210, a processor 220, and a network interface 230 operably coupled to a network N2.

The processor 220 can be, for example, a hardware-based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure and/or the like. The processor 220 is operatively coupled to the memory 210. In some implementations, for example, the processor 220 can be coupled to the memory 210 through a system bus (for example, address bus, data bus and/or control bus). In some implementations, the processor 220 can include multiple parallelly arranged processors.

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the network interface 230. For example, a remote database server can be operatively coupled to the compute device 201.

The memory 210 can store various instructions associated with processes, algorithms and/or data, as described herein. Memory 210 can further include any non-transitory computer-readable storage medium for storing data and/or software that is executable by processor 220, and/or any other medium, which may be used to store information that may be accessed by processor 220 to control the operation of the compute device 201. For example, the memory 210 can store data associated with a synthetic vulnerability data generator 212. The synthetic vulnerability data generator 212 can be configured to generate synthetic vulnerability data based on program type, impact, and/or likelihood of vulnerability occurrences, as described herein. The synthetic vulnerability data generator 212 can be functionally and/or structurally similar to the synthetic vulnerability data generator 112 of FIG. 1.

The network interface 230 can be configured to connect to the network N2, which can be functionally and/or structurally similar to the network N1 of FIG. 1. For example, network N2 can use any of the communication protocols described above with respect to network N1 of FIG. 1. In some implementations, the network interface 230 can include a network interface controller (NIC) that implements a physical and/or data link layer (e.g., Ethernet, Wi-Fi®, etc.).

In some instances, the compute device 201 can further include a display, an input device, and/or an output interface (not shown in FIG. 2). The display can be any display device (e.g., a monitor, screen, etc.) by which the compute device 201 can output and/or display data (e.g., via a user interface that is structurally and/or functionally similar to the user interface 122 of FIG. 1). The input device can include, for example, a mouse, keyboard, touch screen, voice interface, and/or any other hand-held controller or device or interface via which a user may interact with the compute device 201. The output interface can include, for example, a bus, port, and/or other interfaces by which the compute device 201 may connect to and/or output data to other devices and/or peripherals.

Figure 3:
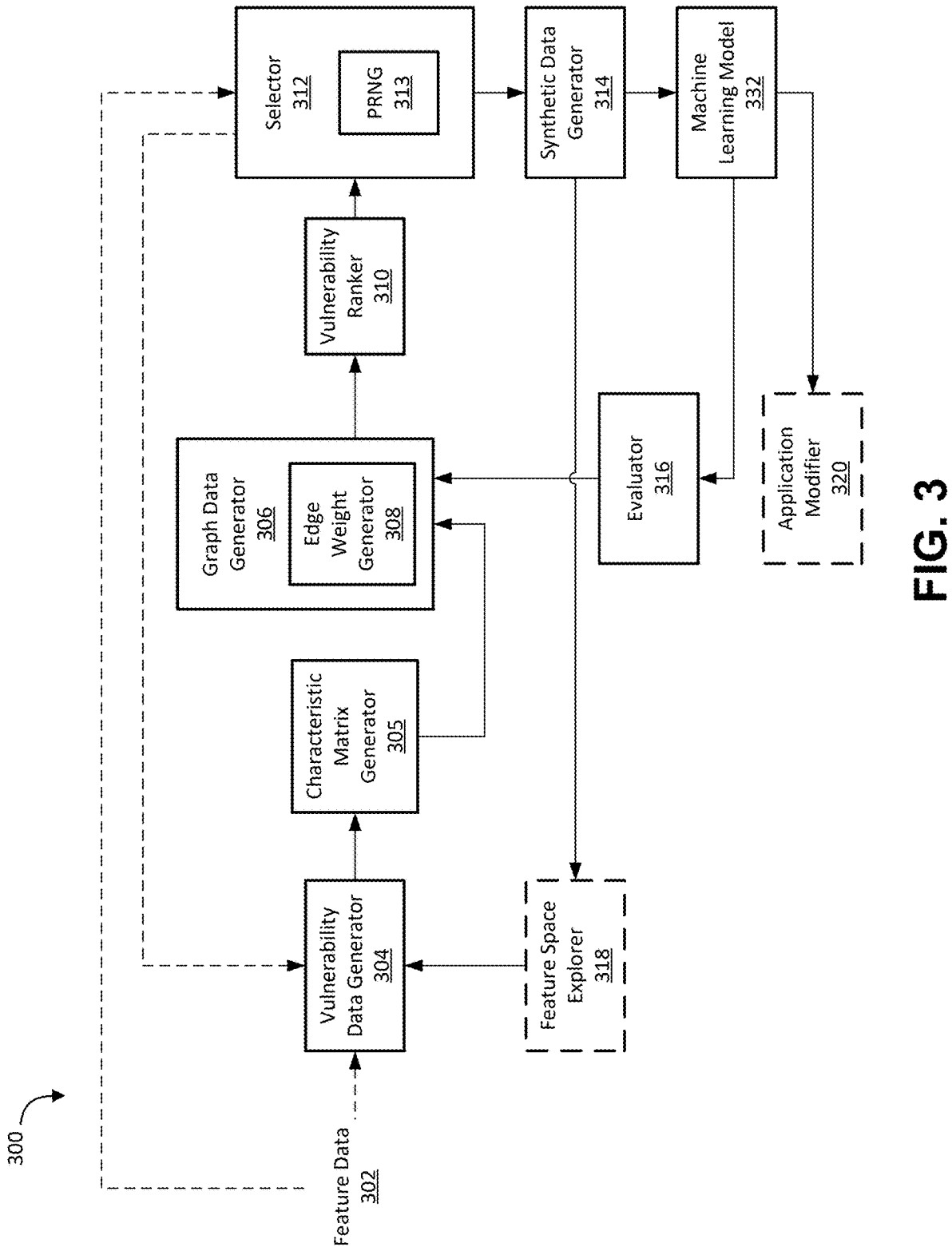
FIG. 3 shows a system block diagram of vulnerability model training components included in a vulnerability model training system, according to an embodiment.

FIG. 3 shows a system block diagram of vulnerability model training components included in a vulnerability model training system, according to an embodiment. At least a portion of the vulnerability model training components 300 can be associated with a compute device (e.g., a compute device that is structurally and/or functionally similar to the compute device 201 of FIG. 2 and/or the compute devices 110 and 120 of FIG. 1). For example, the vulnerability model training components 300 can include, be included in, implement, and/or be associated with (1) the synthetic vulnerability data generator 112 of FIG. 1 and/or (2) the synthetic vulnerability data generator 212 of FIG. 2. In some instances, the vulnerability model training components 300 can include software stored in memory 210 and configured to execute via the processor 220 of FIG. 2. In some instances, at least a portion of the vulnerability model training components 300 can be implemented in hardware (e.g., an ASIC) or a combination of hardware (e.g., a general-purpose processor) and software.

As described herein, the vulnerability model training components 300 can be configured to generate synthetic vulnerability data based on, for example, program type, impact, and/or likelihood of vulnerability occurrences. The vulnerability model training components 300 can then leverage generated datasets to train machine learning models to generate, based on application features, vulnerability predictions.

The vulnerability model training components 300 receive feature data 302 as input and include a vulnerability data generator 304, a characteristic matrix generator 305, a graph data generator 306, a vulnerability ranker 310, a selector 312, a synthetic data generator 314, a machine learning model 332 (e.g., that is functionally and/or structurally similar to machine learning model 132), an evaluator 316, optionally a feature space explorer 318, and optionally an application modifier 320. The graph data generator 306 includes an edge weight generator 308, and the selector 312 includes a pseudorandom number generator (PRNG) 313.

The feature data 302 can represent a collection of features associated with a program (e.g., application software). In some instances, vulnerability testing can have been performed previously on the program, the results of such testing can be used to inform synthetic data generation for another program. Alternatively or in addition, the program can be in the process of undergoing vulnerability testing, and the vulnerability model training components 300 can facilitate that testing by generating synthetic data. A feature can include a property of the program that introduces the possibility of a vulnerability and/or can be involved in an effect of a vulnerability.

Examples of a feature can include functionalities that a program implements, such as login functionality, authentication functionality, implementation of data entry forms, file upload functionality, instant messaging, implementation of user profiles, etc. A feature can also represent a use case (e.g., field of use, business use, etc.) of the program, such as e-commerce, social media, etc. Alternatively or in addition, a feature can represent (1) a level of data sensitivity (e.g., affected by public data, confidential data, financial record data, personally identifiable information (PII), associated with the program), (2) integrations with the program (e.g., integrations with a payment gateway, a database, a short message service (SMS), etc.), (3) a platform and/or technology that implements the program (e.g., .Net, Java, Python, etc.), and/or (4) the like. Below is a mathematical representation of features, where F is a superset of features associated with a program:

$$F = \{f1, f2, f3, \ldots, fn\}$$

The vulnerability data generator 304 can receive the feature data 302 as input to generate vulnerability data that represents vulnerabilities associated with the features represented by the feature data 302. Similar to features described above, possible vulnerabilities can be represented as another set, denoted as V. Each element within this set can represent a specific vulnerability that could potentially affect the program. For instance, elements of V can include, for example, SQL injection, cross-site scripting (XSS), buffer overflows, etc. In some instances, the vulnerability data generator 304 can perform a lookup operation within a database associated with a vulnerability evaluation standard (e.g., Common Weakness Enumeration (CWE), National Vulnerability Database (NVD), etc.) that maps vulnerabilities to features. As shown below, V represents a superset of identifiable vulnerabilities that the program can potentially be subject to:

$$V = \{v1, v2, v3, \ldots, vn\}$$

In some instances, a program can have a subset of features, denoted as $F^1$, from a superset of features and can have an associated vulnerability subset, $V^1$, with a constraint that the cardinality of $F^1$ cannot be zero, whereas the cardinality of $V^1$ can be zero or greater. Individual vulnerabilities can have one or more characteristics that can impact the program and/or that can impact an entity (e.g., an organization) associated with the program. For example, a characteristic of a vulnerability can include a business impact of the vulnerability (financial impact, operational impact, reputational impact, regulatory impact, safety impact, etc.), a likelihood of occurrence of a vulnerability, and/or other relevant factors. These characteristics can be represented as characteristic metric values (e.g., numerical values) associated with a risk scoring standard (e.g., the Common Vulnerability Scoring System (CVSS) and/or the like). As a result, in some instances, a characteristic metric value can include a predefined metric value for a given vulnerability. The characteristic matrix generator 305 can be configured to generate characteristic matrix data that represents a matrix of characteristic metric values for a plurality of vulnerabilities. Assuming a finite number of such characteristics/factors c1, c2, . . . , cn, where c is greater than or equal to zero, the matrix generated by the characteristic matrix generator 305 and representing vulnerabilities and associated characteristics can be illustrated as below:

$$V = \{v1 = [c1(v1) \; c2(v1) \; \ldots \; cn(v1)],$$
$$v2 = [c1(v2) \; c2(v2) \; \ldots \; cn(v2)],$$
$$v3 = [c1(v3) \; c2(v3) \; \ldots \; cn(v3)],$$
$$\ldots ,$$
$$vn = [c1(vn) \; c2(vn) \; \ldots \; cn(vn)]\}$$

The matrix V above can represent a larger set of possible vulnerabilities, and the graph data generator 306 can generate graph data that associates a subset of the larger set of possible vulnerabilities to each specific feature represented by the feature data 302. To represent this association, the graph data generator 306 can generate graph data that represents a graph (e.g., a directed acyclic graph (DAG)), based on the matrix generated by the characteristic matrix generator 305. More specifically, the graph data can be structured to represent an adjacency matrix and/or the like, which in turn can represent the graph. The graph can include a plurality of directed edges. A directed edge can originate from an indication of a feature (e.g., a feature node) and terminate at an indication of a vulnerability (e.g., a vulnerability node), such that the directed edge represents an influence of the feature on a characteristic of the vulnerability. A feature can influence (e.g., determine) the characteristics of a vulnerability; however, in at least some instances a vulnerability does not impact the feature. Similarly stated, a feature can represent an independent variable, and a vulnerability can represent a dependent variable relative to the feature. As a result, in at least some instances, the graph data can represent directed edges from indications of features to indications of vulnerabilities and not, for example, undirected edges. The edge weight generator 308 can assign an edge weight to each directed edge based on the characteristic metric value for that vulnerability. The edge weight (defined below) can represent a severity of a vulnerability for a feature, based on the cumulative characteristics for that vulnerability. Summarizing the above, the graph data generated by the graph data generator 306 represents a directed edge (f1, v1) from a feature to at least one vulnerability, which has an edge weight that represents the feature's influence on each characteristic of a vulnerability. This influence on each characteristic is represented below by a respective factor d, which is a positive number greater than or equal to zero. In some instances, the factor d can be, be similar to, and/or can be based on the factor c described above.

$$f1v1 = [d1(v1) \; d2(v1) \; \ldots \; dn(v1)]$$

The set of correlations between features and vulnerabilities can be represented as follows:

$$FV = \{f1v1, f2v1, \ldots, fnv1, f1v2, \ldots, fnvn\}$$

Figure 4:
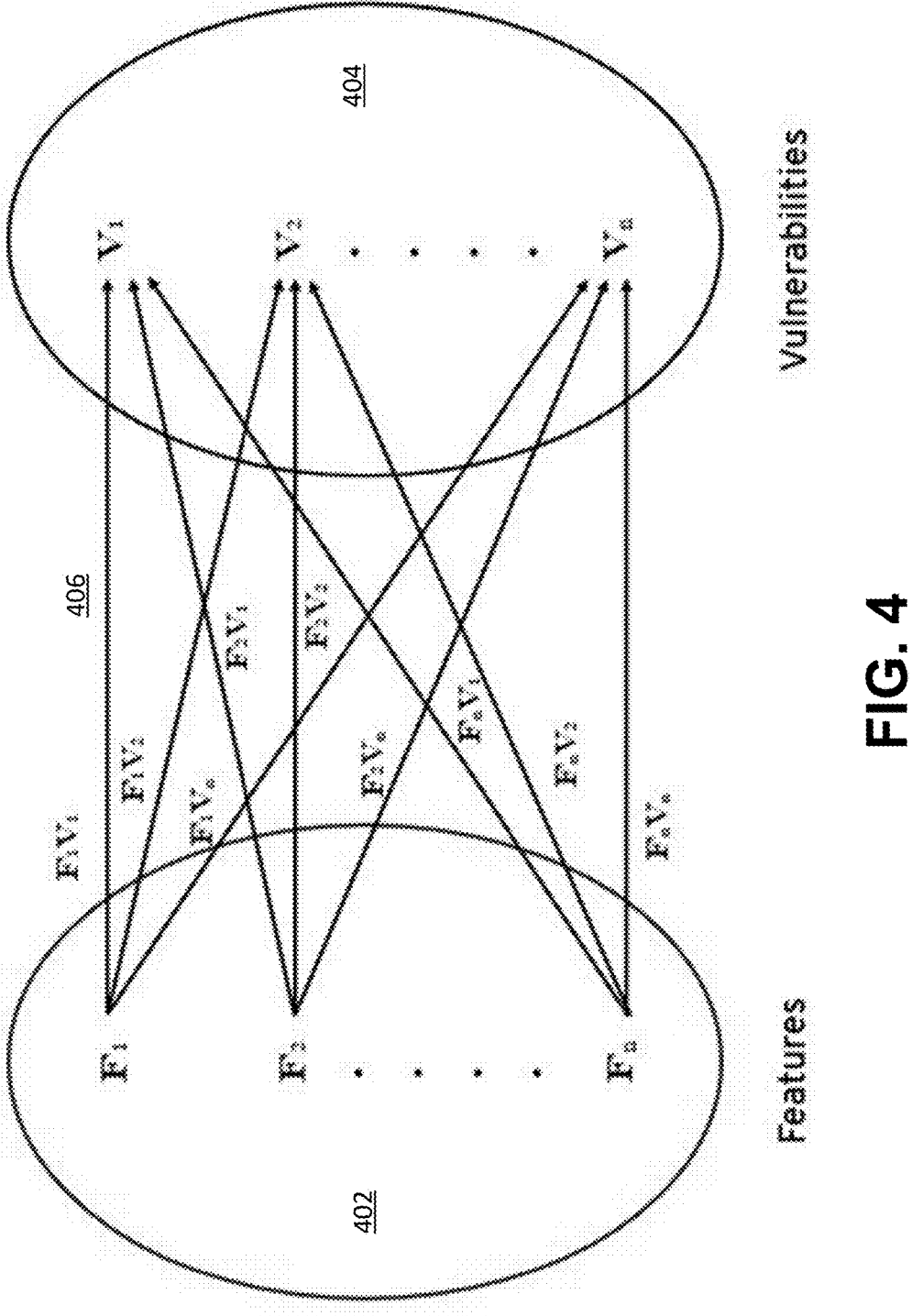
FIG. 4 shows a schematic representation of a feature space, a vulnerability space, and associated correlations represented by directed edges, according to an embodiment.

Turning away momentarily from FIG. 3, FIG. 4 shows a schematic representation of a graph 400 that represents a feature space 402, a vulnerability space 404, and associated correlations represented by a plurality of directed edges (including the directed edge 406), according to an embodiment. The graph 400 can be represented by graph data generated by a graph data generator (e.g., that is functionally and/or structurally similar to the graph data generator 306 of FIG. 3). As shown in FIG. 4, a feature can be coupled to a plurality of directed edges, such that the graph 400 associates the feature with a plurality of vulnerabilities. Alternatively or in addition, a vulnerability can be coupled to a plurality of edges, such that the graph 400 associates a vulnerability with a plurality of features. The directed edge 406 (denoted in FIG. 4 as $F_1 V_1$) can have an edge weight defined by an edge weight generator (e.g., that is functionally and/or structurally similar to the edge weight generator 308 of FIG. 3).

Returning to FIG. 3, the vulnerability ranker 310 can be configured to generate an importance matrix P, which can represent a modification to the importance of each characteristic of a vulnerability. In some instances, the vulnerability ranker 310 can generate the importance matrix P (also referred to herein as weighting matrix P) based on a user-defined and/or predefined importance metric for a given vulnerability characteristic with respect to a given feature. The matrix P can have numerical weights for each characteristic c1, c2, . . . , cn; these numerical weights are shown as p1, p2, . . . , pn below:

$$P = [p1 \ p2 \ ... \ pn]$$

To identify the base characteristics of a vulnerability v1, the vulnerability ranker 310 can be configured to perform a Hadamard product of two matrices described above: the characteristic matrix of the vulnerability v1 (generated by the characteristic matrix generator 305) and the weighting matrix P. This Hadamard product is shown below:

$$Cb(v1) = P \circ v1$$

Considering the influence of various features on a vulnerability, as defined by the graph data produced by the graph data generator 306, the vulnerability ranker 310 can generate a rank metric for a vulnerability by calculating a Hadamard product of matrices, as shown below:

$$Cr(v1) = Cb(v1) \circ f1v1 \circ f2v10 \circ \ ... \ \circ fnv1$$

In some instances, a matrix resulting from the above operation can be converted into a metric value based on a sum of elements of the resulting matrix. Summarizing the Hadamard product described above, the number of features that involve a particular vulnerability influences the relative importance of that vulnerability, which can be captured by the rank metric. The vulnerability ranker 310 can output ranked/sorted vulnerability data that represents an order of the vulnerabilities that are mapped to at least one feature, based on each rank metric (e.g., the Hadamard product) for each vulnerability. In some implementations, the vulnerability ranker 310 can determine a normalized metric for each vulnerability by applying a normalization technique (e.g., minmax normalization) to the rank metric, such that the normalized metric defines a range of values (e.g., between 0 and 100 and/or the like).

Before the synthetic data generator 314 generates synthetic data, the selector 312 can select a set of possible/feasible features (F) from a larger feature set and/or a set of possible vulnerabilities (V) from a larger vulnerability set. More specifically, the selector 312 can define (e.g., based on observed/real world data baselines) a median number of features (Mf) and a median number of vulnerabilities (Mv), under a constraint that Mf is greater than zero and Mv is greater than or equal to zero. The selector 312 can use the PRNG 313 to determine the number of data samples to be produced.

Figure 5:
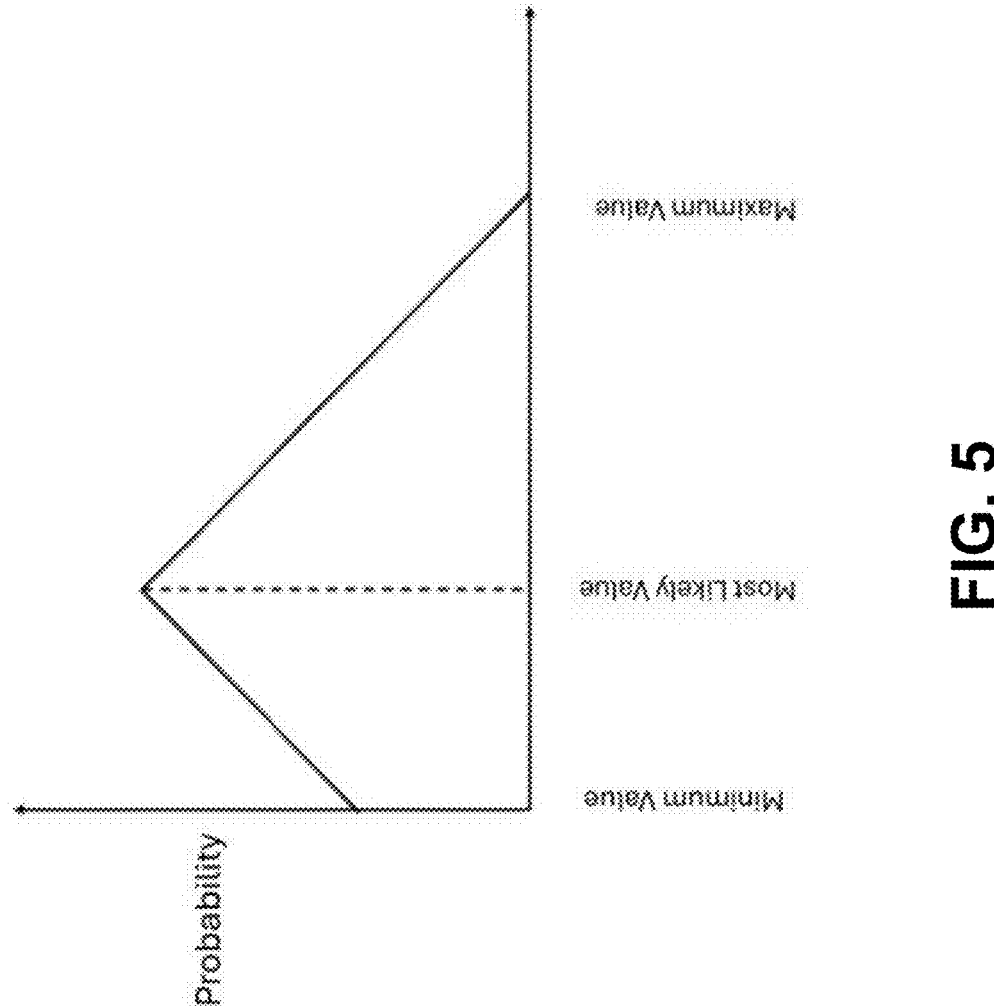
FIG. 5 shows a triangle distribution associated with a pseudorandom number generator (PRNG), according to an embodiment.
Figure 5:

Turning away momentarily from FIG. 3 to describe PRNGs in more detail, FIG. 5 shows a triangle distribution 500 associated with a pseudorandom number generator (PRNG), according to an embodiment. This PRNG can be functionally and/or structurally similar to the PRNG 313 of FIG. 3. As represented by the triangle distribution 500, the PRNG can produce a median value at highest probability relative to other values, and the probability for other values falls evenly with distance from either side of the median.

Returning to FIG. 3, optionally, the selector 312 can define a set of constraints (R) to be applied to feature selection to eliminate features that are mutually exclusive and unlikely to occur in combination. For example, in at least some instances, multi-factor authentication cannot be a feature of a program that lacks authentication, and the selector 312 can define a constraint that represents this restriction. Thus, instead of the feature data 302 being provided directly to the vulnerability data generator 304, the selector 312 can optionally filter the feature data 302 to produce filtered feature data, and this filtered data can be provided as input (instead of the feature data 302) to the vulnerability data generator 304. The filtered feature data can include a subset of the feature data 302 that does not violate a constraint. More specifically, in some implementations, the selector 312 can, using the PRNG 313, randomly select a number of features (Nf) and/or a number of vulnerabilities (Nv) for the synthetic application. Based on the number of features (Nf), the selector 312 can create a random subset of features (F1) from the possible set of features (F) represented by the feature data 302. The selector 312 can further evaluate the legality of the subset F1 based on constraints (described above) to remove features that do not coexist. If the subset F1 is entirely illegal with respect to the constraints, the selector 312 can be configured to again randomly select features from the feature data 302.

Returning to the sorted vulnerability data generated by the vulnerability ranker 310, for each vulnerability represented in the sorted vulnerability data generator, the selector 312 can use the PRNG 313 (and/or a PRNG having an equal probability for all outcomes, rather than a triangle distribution as described in relation to FIG. 5) to select a number between, for example, 0 and 99 or another range. The selector 312 can then perform a comparison with the normalized metric value described above in relation to the vulnerability ranker 310. For example, in some implementations, if the selected number is less (or, alternatively, more) than the normalized metric value for a vulnerability from the sorted vulnerability data, the selector 312 can include the vulnerability in a processed vulnerability set; otherwise, if the selected number is more (or, alternatively, less) than the normalized metric value, the selector 312 can exclude/reject the vulnerability from the processed vulnerability set. This process can be repeated until the number of vulnerabilities selected equals Nv. As a result of the process described above, selected vulnerabilities can be randomized (or pseudorandomized), which can increase the breadth/variability of the overall synthetic training data. By processing vulnerabilities in order of the normalized metric value, a vulnerability having higher importance can be more likely to be included in the processed vulnerability set before the number of vulnerabilities selected equals Nv.

The synthetic data generator 314 can receive from the selector 312 an indication of the processed vulnerability set and an indication of associated features for each vulnerability from the processed vulnerability set. In response, the synthetic data generator 314 can generate synthetic vulnerability data. Synthetic vulnerability data can include, for example, sample penetration testing data, which can include a set (e.g., a list) of application features and associated vulnerabilities. In some instances, based on the method implemented by the vulnerability model training components 300 as described above, this synthetic data can mimic real-world vulnerability data. In some implementations, the synthetic data generator 314 can be configured to cause a plurality of processed vulnerability sets to be produced until the number of vulnerabilities selected equals Nv.

Summarizing the above, a pseudocode representation for a method implemented by the vulnerability model training components 300 described thus far is provided below:

```
// Initialization
Set Mf to a median number of features, ensuring Mf > 0
Set Mv to a median number of vulnerabilities, ensuring Mv >= 0
Sets to the number of data samples to be produced
Initialize PRNG with a triangular distribution centered at Mf and Mv
Define a set of constraints R for feature selection
// Data Generation
FOR each sample from 1 to s DO
    Generate Nf using PRNG based on Mf
    Generate Nv using PRNG based on Mv
    Initialize F1 as an empty set
    WHILE F1 is not legal OR F1 size is not equal to Nf DO
        Generate a random subset of features F1 from the possible set of features F
        Evaluate F1 against constraints Rand remove illegal features
    END WHILE
    Initialize a characteristics matrix for vulnerabilities
    FOR each vulnerability v in the set of vulnerabilities V DO
        Calculate characteristics matrix for v using equation for calculating resultant
    characteristics of a vulnerability
        Convert characteristics matrix to a resultant score
    END FOR
    Sort vulnerabilities in descending order of resultant score
    Apply min max normalization to scores to scale scores to 0-100
    Initialize vulnerability set V1 as an empty set
    WHILE size of Vs is less than Nv DO
        FOR each vulnerability v in the sorted list DO
            Generate a random number between 0 and 100 using PRNGwith equal probability
            IF random number is less than normalized resultant score "THEN
                Include v in vulnerability set V1
            ENDIF
        END FOR
    END WHILE
END FOR
```

Returning to the remainder of the vulnerability model training components 300, the machine learning model 332 can be trained by the synthetic vulnerability data produced by the synthetic data generator 314. The machine learning model 332 can include, for example, a regression-based model, a neural network (e.g., a feed-forward network), etc. In some instances, after the machine learning model 332 is trained, the model can be tested (e.g. by a human operator and/or automatically (without human intervention) by an autonomous agent, such as an LLM-based agent) against a vulnerability benchmark to determine the trained model's accuracy for predicting each vulnerability for a given list of features in a program. The evaluator 316 can be configured to detect deviation from the vulnerability benchmark and, in response, can provide a feedback signal (e.g., that encodes an accuracy metric value for the machine learning model 332, such as an F–1 score and/or the like) to modify a directed edge(s) (e.g., an edge weight(s)) within the graph data generated by the graph data generator 306, modifying the influence of a feature(s) associated with the directed edge(s) on a vulnerability (or vulnerabilities) associated with the directed edge(s). By modifying the graph data, the evaluator 316 can cause the machine learning model 332 to be retrained, in some instances iteratively until the machine learning model 332 achieves a sufficient level of accuracy.

The feature space explorer 318 can be configured to explore consequences brought about by a change to the features of a program. For example, a consequence of an expanded set of features for a program can include introduction of new vulnerabilities and/or an increase to the impact and/or likelihood of a vulnerability. A consequence of a reduced feature set can include elimination of vulnerabilities and/or a reduction to the impact and/or likelihood of a vulnerability. The feature space explorer 318 can therefore be configured to provide expanded and/or reduced feature data to the vulnerability data generator 304 to permit the vulnerability model training components 300 to predict vulnerability changes arising from that expanded and/or reduced feature data.

The application modifier 320 can be configured to automatically (e.g., without human intervention) modify a program/application based on a vulnerability predicted by the machine learning model 332. For example, the application modifier 320 can include an autonomous agent (e.g., an LLM-based agent) configured to generate code to implement the modified program, such that the modified program has an additional feature(s) and/or excludes a feature(s), as compared to the initial, unmodified program. An example of an additional feature can include, for example, multi-factor authentication. An example of a removed feature can include, for example, removed access to a database that stores personally identifiable information (PII).

Summarizing the above, the vulnerability model training components 300 can determine (e.g., before training of the machine learning model 332) an appropriate mix of synthetic data based on a given program's features and the vulnerabilities that can arise from those features. As a result, the vulnerability model training components 300 can adequately train a model based on a reduced amount of generated synthetic data. For example, the vulnerability model training components 300 can generate reduced amounts of synthetic data that relates to, for example, vulnerabilities with low impact and/or have a low likelihood of occurring. As a result, the vulnerability model training components 300 can save compute resources (e.g., processor resources, memory resources, bandwidth resources, etc.) by not generating needless and/or redundant training data.

Additionally, as a result of using less synthetic training data to represent vulnerabilities and features, the machine learning model 332 can be trained in less time and/or in fewer iterations (e.g., iterations facilitated by the evaluator 316). The machine learning model 332, once trained, can also have better prediction performance and/or a lower likelihood of producing biased results, as a result of the synthetic data being more comprehensive/wider in scope.

Moreover, by generating test cases that prioritize vulnerabilities with high impact and/or have a high likelihood of occurring, the model training components 300 can facilitate faster identification of vulnerabilities associated with a program/application. As a result, robustness and/or cybersecurity of programs/applications can be improved, which can improve data privacy, prevent downtime, etc. The model training components 300 can further reduce the need for/use of penetration testing, which can be invasive and/or disruptive, by instead predicting an application's vulnerability exposure based on the application's platform, version, features, and/or other characteristics.

Figure 6:
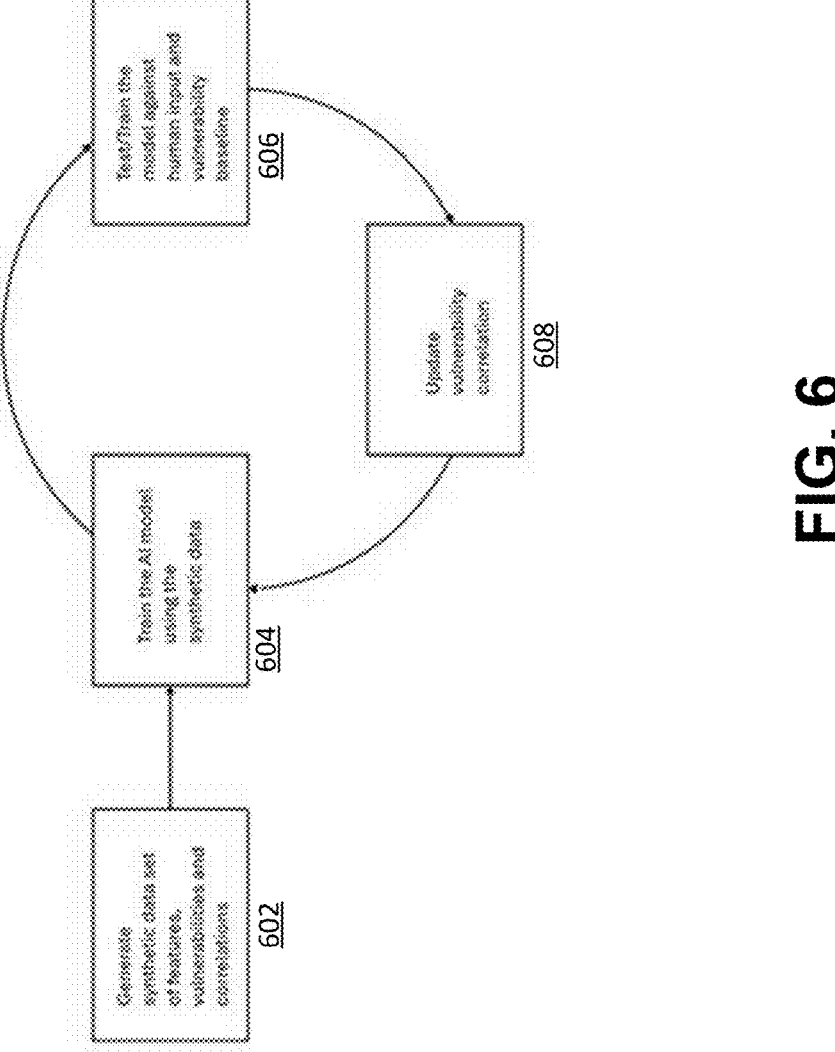
FIG. 6 shows a flow diagram of a method for training and retraining a machine learning model based on synthetic data, according to an embodiment.

FIG. 6 shows a flow diagram of a method 600 for training and retraining a machine learning model based on synthetic data, according to an embodiment. In some instances, the method 600 can be implemented by a vulnerability model training system (e.g., the vulnerability model training system 100 of FIG. 1). Portions of the method 600 can be implemented using a processor (e.g., the processor 220 of FIG. 2) of any suitable compute device (e.g., the compute device 201 of FIG. 2 and/or the compute devices 110 and/or 120 and/or the server 130 of FIG. 1).

The method 600 at 602 includes generating a synthetic data set of features, vulnerabilities, and correlations. At 604, the method 600 includes training an artificial intelligence (AI) model using the synthetic data generated at 602. At 606, the method 600 includes testing and/or training the AI model against a human input and/or a vulnerability baseline. The method 600 at 608 includes updating the vulnerability correlation determined at 602, based on performance of the AI model after the testing and/or training that was performed at 606. The method 600 can repeat from 604 based on the updated vulnerability correlation, until the AI model achieves a threshold level of accuracy.

FIG. 7 shows a flow diagram illustrating a method 700 for causing a machine learning model to be trained based on generated synthetic training data, according to an embodiment. In some instances, the method 700 can be implemented by a vulnerability model training system (e.g., the vulnerability model training system 100 of FIG. 1). Portions of the method 700 can be implemented using a processor (e.g., the processor 220 of FIG. 2) of any suitable compute device (e.g., the compute device 201 of FIG. 2 and/or the compute devices 110 and/or 120 and/or the server 130 of FIG. 1).

The method 700 at 702 includes receiving feature data that indicates a plurality of features of a first application. At 704, the method 700 includes generating, based on the feature data, vulnerability data that indicates a plurality of vulnerabilities associated with the plurality of features. The method 700 further includes at 706 generating, based on the feature data and the vulnerability data, graph data that represents a directed graph having (1) a plurality of first nodes representing the plurality of features, (2) a plurality of second nodes representing the plurality of vulnerabilities, and (3) a plurality of directed edges (a) from the plurality of first nodes to the plurality of second nodes and (b) representing a plurality of correlations between the plurality of features and the plurality of vulnerabilities. At 708, each vulnerability from the plurality of vulnerabilities is ranked based on the graph data to produce sorted vulnerability data. The method 700 at 710 includes selecting, using a pseudo-random number generator, a portion of the sorted vulnerability data representing a subset of vulnerabilities from the plurality of vulnerabilities, to produce synthetic training data. At 712, the method 700 includes causing a machine learning model to be trained based on the synthetic training data to produce a trained machine learning model that is configured to predict vulnerabilities associated with a second application different from the first application.

FIG. 8 shows a flow diagram illustrating a method 800 for generating synthetic training data based on sorted vulnerability data, according to an embodiment. In some instances, the method 800 can be implemented by a vulnerability model training system (e.g., the vulnerability model training system 100 of FIG. 1). Portions of the method 800 can be implemented using a processor (e.g., the processor 220 of FIG. 2) of any suitable compute device (e.g., the compute device 201 of FIG. 2 and/or the compute devices 110 and/or 120 and/or the server 130 of FIG. 1).

The method 800 at 802 includes receiving, at a processor, feature data that indicates a plurality of features of an application. At 804, the method 800 includes generating, via the processor and based on the feature data, vulnerability data that indicates a vulnerability associated with the plurality of features. The method 800 at 806 includes generating, via the processor and based on the feature data and the vulnerability data, graph data that represents (1) a plurality of first nodes representing the plurality of features, (2) a second node representing the vulnerability, and (3) a plurality of edges between the plurality of first nodes and the second node and having a plurality of edge weights that represents a plurality of severities of the vulnerability for the plurality of features. At 808, the method 800 includes generating, via the processor and based on the plurality of edge weights, matrix data that represents an influence of the plurality of features on the vulnerability. The method 800 at 810 includes generating, via the processor, sorted vulnerability data that defines an order for a plurality of vulnerabilities that includes the vulnerability, based on the matrix data. At 812, the method 800 includes generating, via the processor, synthetic training data based on the sorted vulnerability data.

FIG. 9 shows a flow diagram illustrating a method 900 for modifying an application based on a predicted vulnerability, according to an embodiment. In some instances, the method 900 can be implemented by a vulnerability model training system (e.g., the vulnerability model training system 100 of FIG. 1). Portions of the method 900 can be implemented using a processor (e.g., the processor 220 of FIG. 2) of any suitable compute device (e.g., the compute device 201 of FIG. 2 and/or the compute devices 110 and/or 120 and/or the server 130 of FIG. 1).

The method 900 at 902 includes providing, via a processor, first feature data associated with a first application as input to a machine learning model to predict a vulnerability associated with the first application, the machine learning model being trained based on synthetic training data. The synthetic training data is generated by generating, based on second feature data associated with a second application, vulnerability data that indicates a plurality of vulnerabilities associated with a plurality of features represented by the second feature data. The synthetic training data is further generated by determining, based on the second feature data and the vulnerability data, a plurality of correlations between the plurality of features and the plurality of vulnerabilities. Additionally, the synthetic training data is generated by ranking the plurality of vulnerabilities based on the plurality of correlations, to produce sorted vulnerability data, and selecting, using a pseudorandom number generator, a portion of the sorted vulnerability data representing a subset of vulnerabilities from the plurality of vulnerabilities, to produce the synthetic training data. The method 900 at 904 further includes modifying, via the processor, the first application based on the vulnerability.

According to an embodiment, a non-transitory, processor-readable medium stores instructions that, when executed by a processor, cause the processor to receive feature data that indicates a plurality of features of a first application. The instructions further cause the processor to generate, based on the feature data, vulnerability data that indicates a plurality of vulnerabilities associated with the plurality of features. Additionally, the instructions cause the processor to generate, based on the feature data and the vulnerability data, graph data that represents a directed graph having (1) a plurality of first nodes representing the plurality of features, (2) a plurality of second nodes representing the plurality of vulnerabilities, and (3) a plurality of directed edges (a) from the plurality of first nodes to the plurality of second nodes and (b) representing a plurality of correlations between the plurality of features and the plurality of vulnerabilities. Each vulnerability from the plurality of vulnerabilities is ranked based on the graph data to produce sorted vulnerability data, and using a pseudorandom number generator, a portion of the sorted vulnerability data representing a subset of vulnerabilities from the plurality of vulnerabilities is selected, to produce synthetic training data. The instructions also cause the processor to cause a machine learning model to be trained based on the synthetic training data to produce a trained machine learning model that is configured to predict vulnerabilities associated with a second application different from the first application.

In some implementations, the non-transitory, processor-readable medium further stores instructions to cause the processor to define, based on a plurality of predefined metric values associated with the plurality of vulnerabilities, a plurality of edge weights for the plurality of directed edges, the plurality of vulnerabilities being ranked based on the plurality of edge weights. In some implementations, the plurality of predefined metric values is associated with a vulnerability evaluation standard. In some implementations, the non-transitory, processor-readable medium further stores instructions to cause the processor to (1) randomly select a first subset of features from the plurality of features and (2) remove a feature from the first subset of features based on a constraint that defines a mutual exclusivity between the feature and a remaining feature from the first subset of features, to produce a second subset of features, the synthetic training data being produced based on the second subset of features. In some implementations, the instructions to cause the processor to select the portion of the sorted vulnerability data include instructions to cause the processor to determine a normalized metric value based on the graph data. For each vulnerability from the plurality of vulnerabilities, the instructions further cause the processor to (1) use the pseudorandom number generator to generate an output for that vulnerability and (2) one of select or reject data (a) from the sorted vulnerability data and (b) representing that vulnerability, based on a comparison between the normalized metric value and the output for that vulnerability, to result in the portion of the sorted vulnerability data.

In some implementations, the instructions to cause the processor to rank the plurality of vulnerabilities include instructions to cause the processor to, for each second node from the plurality of second nodes, determine a Hadamard product for that second node based on each directed edge from the plurality of directed edges that is connected to that second node, to produce a plurality of Hadamard products. The instructions further cause the processor to rank each vulnerability from the plurality of vulnerabilities based on the Hadamard product for a second node that is associated with that vulnerability and that is from the plurality of second nodes, to produce the sorted vulnerability data. In some implementations, the plurality of features is associated with at least one of a function of the first application, a use for the first application, a sensitivity of data accessible by the first application, an integration implemented by the first application, or a platform that implements the first application. In some implementations, the pseudorandom number generator is configured to generate an output based on a triangle probability distribution.

In some implementations, the instructions to cause the processor to rank the plurality of vulnerabilities include instructions to cause the processor to define a characteristic matrix for each vulnerability from the plurality of vulnerabilities based on each directed edge from the plurality of directed edges that is connected to a second node from the plurality of second nodes that represents that vulnerability. The instructions further cause the processor to determine a characteristic metric for each vulnerability from the plurality of vulnerabilities by performing a sum of elements based on the characteristic matrix for that vulnerability, that vulnerability being ranked based on that characteristic metric. In some implementations, the non-transitory, processor-readable medium further stores instructions to cause the processor to receive a first feedback signal that encodes a first accuracy metric value for the machine learning model and, in response to the first accuracy metric value being below a predefined threshold value, iteratively produce the synthetic training data. The instructions also cause the processor to receive a second feedback signal that encodes a second accuracy metric value for the machine learning model and, in response to the second accuracy metric value being above the predefined threshold value, stop producing the synthetic training data.

According to an embodiment, a method includes receiving, at a processor, feature data that indicates a plurality of features of an application. The method further includes generating, via the processor and based on the feature data, vulnerability data that indicates a vulnerability associated with the plurality of features. Additionally, the method includes generating, via the processor and based on the feature data and the vulnerability data, graph data that represents (1) a plurality of first nodes representing the plurality of features, (2) a second node representing the vulnerability, and (3) a plurality of edges between the plurality of first nodes and the second node and having a plurality of edge weights that represents a plurality of severities of the vulnerability for the plurality of features. Based on the plurality of edge weights, the method also includes generating, via the processor, matrix data that represents an influence of the plurality of features on the vulnerability. The method further includes generating, via the processor, sorted vulnerability data that defines an order for a plurality of vulnerabilities that includes the vulnerability, based on the matrix data. Synthetic training data is generated as part of the method, via the processor, based on the sorted vulnerability data.

In some implementations, the plurality of edge weights is defined based on a plurality of predefined metric values associated with (1) the vulnerability and (2) a vulnerability evaluation standard. In some implementations, the method further includes randomly selecting, via the processor, a first subset of features from the plurality of features. The method can also include removing, via the processor, a feature from the first subset of features based on a constraint that defines a mutual exclusivity between the feature and a remaining feature from the first subset of features, to produce a second subset of features, the synthetic training data being produced based on the second subset of features. In some implementations, the method further includes determining, via the processor, a normalized metric value based on the graph data and, for each vulnerability from the plurality of vulnerabilities, using a pseudorandom number generator to generate, via the processor, an output for that vulnerability. The method can also include one of selecting or rejecting, via the processor, data (1) from the sorted vulnerability data and (2) representing that vulnerability, based on a comparison between the normalized metric value and the output for that vulnerability, to result in a portion of the sorted vulnerability data, the synthetic training data being generated based on the portion of the sorted vulnerability data.

In some implementations, the method further includes performing, via the processor, a Hadamard product operation on the matrix data to rank the vulnerability from the plurality of vulnerabilities, to produce the sorted vulnerability data. In some implementations, the plurality of features is associated with at least one of a function of the application, a use for the application, a sensitivity of data accessible by the application, an integration implemented by the application, or a platform that implements the application. In some implementations, the application is a first application, and the method further includes causing, via the processor, a machine learning model to be trained based on the synthetic training data to predict vulnerabilities associated with a second application different from the first application.

According to an embodiment, a method includes providing, via a processor, first feature data associated with a first application as input to a machine learning model to predict a vulnerability associated with the first application, the machine learning model being trained based on synthetic training data. The synthetic training data is generated by generating, based on second feature data associated with a second application, vulnerability data that indicates a plurality of vulnerabilities associated with a plurality of features represented by the second feature data. The synthetic training data is further generated by determining, based on the second feature data and the vulnerability data, a plurality of correlations between the plurality of features and the plurality of vulnerabilities. Additionally, the synthetic training data is generated by ranking the plurality of vulnerabilities based on the plurality of correlations, to produce sorted vulnerability data, and selecting, using a pseudorandom number generator, a portion of the sorted vulnerability data representing a subset of vulnerabilities from the plurality of vulnerabilities, to produce the synthetic training data. The method further includes modifying, via the processor, the first application based on the vulnerability.

In some implementations, the ranking the plurality of vulnerabilities includes, for each vulnerability from the plurality of vulnerabilities, determining a Hadamard product for that vulnerability based on at least one second feature that is associated with that vulnerability and that is from the plurality of features, to produce a plurality of Hadamard products. The ranking the plurality of vulnerabilities also includes ranking each vulnerability from the plurality of vulnerabilities based on the Hadamard product for that vulnerability, to produce the sorted vulnerability data. In some implementations, the synthetic training data is generated further by (1) randomly selecting a first subset of second features from the plurality of features and (2) removing a feature from the first subset of second features based on a constraint that defines a mutual exclusivity between the feature and a remaining feature from the first subset of second features, to produce a second subset of second features, the synthetic training data being produced based on the second subset of second features.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium and/or a machine-readable medium) having instructions or computer code thereon for performing various computer-implemented operations. The computer-readable medium (or processor-readable medium, machine-readable medium, etc.) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory, processor-readable medium storing instructions that, when executed by a processor, cause the processor to:
   receive feature data that indicates a plurality of features of a first application;
   generate, based on the feature data, vulnerability data that indicates a plurality of vulnerabilities associated with the plurality of features;
   generate, based on the feature data and the vulnerability data, graph data that represents a directed graph having (1) a plurality of first nodes representing the plurality of features, (2) a plurality of second nodes representing the plurality of vulnerabilities, and (3) a plurality of directed edges (a) from the plurality of first nodes to the plurality of second nodes and (b) representing a plurality of correlations between the plurality of features and the plurality of vulnerabilities;
   rank the plurality of vulnerabilities based on the graph data to produce sorted vulnerability data;

select, using a pseudorandom number generator, a portion of the sorted vulnerability data representing a subset of vulnerabilities from the plurality of vulnerabilities, to produce synthetic training data; and cause a machine learning model to be trained based on the synthetic training data to produce a trained machine learning model that is configured to predict vulnerabilities associated with a second application different from the first application.

2. The non-transitory, processor-readable medium of claim 1, further storing instructions to cause the processor to:

define, based on a plurality of predefined metric values associated with the plurality of vulnerabilities, a plurality of edge weights for the plurality of directed edges, the plurality of vulnerabilities being ranked based on the plurality of edge weights.

3. The non-transitory, processor-readable medium of claim 2, wherein the plurality of predefined metric values is associated with a vulnerability evaluation standard.

4. The non-transitory, processor-readable medium of claim 1, further storing instructions to cause the processor to:

randomly select a first subset of features from the plurality of features; and remove a feature from the first subset of features based on a constraint that defines a mutual exclusivity between the feature and a remaining feature from the first subset of features, to produce a second subset of features, the synthetic training data being produced based on the second subset of features.

5. The non-transitory, processor-readable medium of claim 1, wherein the instructions to cause the processor to select the portion of the sorted vulnerability data include instructions to cause the processor to:

determine a normalized metric value based on the graph data; and for each vulnerability from the plurality of vulnerabilities:

use the pseudorandom number generator to generate an output for that vulnerability, and one of select or reject data (1) from the sorted vulnerability data and (2) representing that vulnerability, based on a comparison between the normalized metric value and the output for that vulnerability, to result in the portion of the sorted vulnerability data.

6. The non-transitory, processor-readable medium of claim 1, wherein the instructions to cause the processor to rank the plurality of vulnerabilities include instructions to cause the processor to:

for each second node from the plurality of second nodes, determine a Hadamard product for that second node based on each directed edge from the plurality of directed edges that is connected to that second node; and rank each vulnerability from the plurality of vulnerabilities based on the Hadamard product for a second node that is associated with that vulnerability and that is from the plurality of second nodes, to produce the sorted vulnerability data.

7. The non-transitory, processor-readable medium of claim 1, wherein the plurality of features is associated with at least one of a function of the first application, a use for the first application, a sensitivity of data accessible by the first application, an integration implemented by the first application, or a platform that implements the first application.

8. The non-transitory, processor-readable medium of claim 1, wherein the pseudorandom number generator is configured to generate an output based on a triangle probability distribution.

9. The non-transitory, processor-readable medium of claim 1, wherein the instructions to cause the processor to rank the plurality of vulnerabilities include instructions to cause the processor to:

define a characteristic matrix for each vulnerability from the plurality of vulnerabilities based on each directed edge from the plurality of directed edges that is connected to a second node from the plurality of second nodes that represents that vulnerability; and determine a characteristic metric for each vulnerability from the plurality of vulnerabilities by performing a sum of elements based on the characteristic matrix for that vulnerability, that vulnerability being ranked based on that characteristic metric.

10. The non-transitory, processor-readable medium of claim 1, further storing instructions to cause the processor to:

receive a first feedback signal that encodes a first accuracy metric value for the machine learning model;

in response to the first accuracy metric value being below a predefined threshold value, iteratively produce the synthetic training data;

receive a second feedback signal that encodes a second accuracy metric value for the machine learning model; and in response to the second accuracy metric value being above the predefined threshold value, stop producing the synthetic training data.

11. A method, comprising:

receiving, at a processor, feature data that indicates a plurality of features of an application;

generating, via the processor and based on the feature data, vulnerability data that indicates a vulnerability associated with the plurality of features;

generating, via the processor and based on the feature data and the vulnerability data, graph data that represents (1) a plurality of first nodes representing the plurality of features, (2) a second node representing the vulnerability, and (3) a plurality of edges between the plurality of first nodes and the second node and having a plurality of edge weights that represents a plurality of severities of the vulnerability for the plurality of features;

generating, via the processor and based on the plurality of edge weights, matrix data that represents an influence of the plurality of features on the vulnerability;

generating, via the processor, sorted vulnerability data that defines an order for a plurality of vulnerabilities that includes the vulnerability, based on the matrix data; and generating, via the processor, synthetic training data based on the sorted vulnerability data.

12. The method of claim 11, wherein the plurality of edge weights is defined based on a plurality of predefined metric values associated with (1) the vulnerability and (2) a vulnerability evaluation standard.

13. The method of claim 11, further comprising:

randomly selecting, via the processor, a first subset of features from the plurality of features; and removing, via the processor, a feature from the first subset of features based on a constraint that defines a mutual exclusivity between the feature and a remaining feature from the first subset of features, to produce a second subset of features, the synthetic training data being produced based on the second subset of features.

14. The method of claim 11, further comprising:

determining, via the processor, a normalized metric value based on the graph data; and for each vulnerability from the plurality of vulnerabilities:

using a pseudorandom number generator to generate, via the processor, an output for that vulnerability, and one of selecting or rejecting, via the processor, data (1) from the sorted vulnerability data and (2) representing that vulnerability, based on a comparison between the normalized metric value and the output for that vulnerability, to result in a portion of the sorted vulnerability data, the synthetic training data being generated based on the portion of the sorted vulnerability data.

15. The method of claim 11, further comprising:

performing, via the processor, a Hadamard product operation on the matrix data to rank the vulnerability from the plurality of vulnerabilities, to produce the sorted vulnerability data.

16. The method of claim 11, wherein the plurality of features is associated with at least one of a function of the application, a use for the application, a sensitivity of data accessible by the application, an integration implemented by the application, or a platform that implements the application.

17. The method of claim 11, wherein the application is a first application, the method further comprising:

causing, via the processor, a machine learning model to be trained based on the synthetic training data to predict vulnerabilities associated with a second application different from the first application.

18. A method, comprising:

providing, via a processor, first feature data associated with a first application as input to a machine learning model to predict a vulnerability associated with the first application, the machine learning model being trained based on synthetic training data that is generated by:

generating, based on second feature data associated with a second application, vulnerability data that indicates a plurality of vulnerabilities associated with a plurality of features represented by the second feature data, determining, based on the second feature data and the vulnerability data, a plurality of correlations between the plurality of features and the plurality of vulnerabilities, ranking the plurality of vulnerabilities based on the plurality of correlations, to produce sorted vulnerability data, and selecting, using a pseudorandom number generator, a portion of the sorted vulnerability data representing a subset of vulnerabilities from the plurality of vulnerabilities, to produce the synthetic training data; and modifying, via the processor, the first application based on the vulnerability.

19. The method of claim 18, wherein the ranking the plurality of vulnerabilities includes:

for each vulnerability from the plurality of vulnerabilities, determining a Hadamard product for that vulnerability based on at least one second feature that is associated with that vulnerability and that is from the plurality of features, to produce a plurality of Hadamard products; and ranking each vulnerability from the plurality of vulnerabilities based on the Hadamard product for that vulnerability, to produce the sorted vulnerability data.

20. The method of claim 18, wherein the synthetic training data is generated further by:

randomly selecting a first subset of second features from the plurality of features; and removing a feature from the first subset of second features based on a constraint that defines a mutual exclusivity between the feature and a remaining feature from the first subset of second features, to produce a second subset of second features, the synthetic training data being produced based on the second subset of second features.

\* \* \* \* \*